United States Patent Office 2,766,259
Patented Oct. 9, 1956

2,766,259

ACETALS OF 2-FORMYL-6-ALKOXYTETRA-HYDROPYRANS

Richard R. Whetstone, Orinda, Calif., assignor to Shell Development Company, San Francisco, Calif., a corporation of Delaware No Drawing. Application June 17, 1950,
Serial No. 168,863

6 Claims. (Cl. 260—345.9)

This invention relates to novel oxygen-heterocyclic organic compounds. More particularly, the present invention relates to novel derivatives of tetrahydropyran, and to a method for their preparation.

The new compounds of the invention are those compounds having structures represented by the general formula

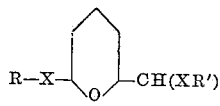

in which RX and R'X represent the radicals derived from alcohols RXH and R'XH, and X represents oxygen or sulfur. In the present specification and claims the term "alcohol" is employed in its generic sense to include both the oxy-alcohols and the sulfur alcohols, or mercaptans. In the above formula, the group represented by

is a tetrahydropyran nucleus which, in its unsubstituted form, conforms to the structural formula

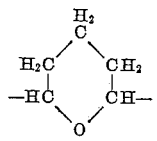

A more limited group of the novel compounds of the invention is described by the formula

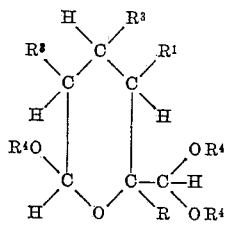

where R, R¹, R², and R³ each represents either hydrogen or an alkyl radical, and R⁴ represents an alkyl radical.

The new products of the invention have properties that adapt them to various technically important uses. They are of interest as insolubilizing agents for water-soluble high molecular-weight hydroxyl-bearing substances. The new compounds thus are capable of acting upon such hydroxylated materials, preferably in the presence of aqueous acid, to form products having a substantially reduced solubility in water and in some instances a materially increased melting or softening point. By treating such water-soluble high molecular weight polyhydric alcohols as polyvinyl alcohols, polyallyl alcohols, water-soluble cellulose derivatives, and the like, with compounds described by the above formula, there can be obtained tough, adherent, insoluble products that are useful in or as adhesives, coating compositions, impregnants, etc., in the manufacture of photographic film, or as or in plastic compositions adapted to be molded or pressed into a predetermined shape. The products of the invention also include physiologically active compounds and compounds useful as pharmaceutical chemicals and in the preparation of pharmaceutical chemicals. The acetal-type structure of the new compounds, which will be seen to include two dissimilar acetal groupings, makes the products of interest as chemical intermediates from which a wide variety of compounds can be prepared. When the groups represented by R and R' are radicals derived from olefinically unsaturated alcohols, such as allyl alcohol, methallyl alcohol, or 2-chloroallyl acohol, the monomeric compounds can be polymerized to obtain useful polymers. The compounds in which the alcohol radicals R and R' are derived from long-chain acyclic alcohols, containing preferably from 8 to 20 carbon atoms can be used as plasticizers and emollients.

According to the invention the new compounds can be prepared conveniently by reacting a 2-hydroxyhexanedial, that is, a hydroxy-substituent dialdehyde wherein the formyl groups are separated by an unbroken acyclic saturated chain of four carbon atoms and one of the carbon atoms in the alpha position relative to a formyl group is substituted by a hydroxyl group, with an alcohol in the presence of an acidic catalyst. The desired reaction may be carried out by mixing the selected 2-hydroxyhexanedial, preferably in the form of an aqueous solution, with the alcohol and heating the mixture in the presence of an added acidic catalyst. Although any acidic condensation catalyst may be used, it is preferred to use a strong acid, preferably a strong mineral acid, as the catalyst. Suitable strong acids include, among others, HCl, H₂SO₄, H₃PO₄, HBr, H₂SeO₄, H₂SO₃, HNO₃, and even strong organic acids, such as aromatic sulfonic acids, trichloroacetic acid, oxalic acid, and the like. Acidic salts also may be used as the catalyst, such as aluminum sulfate, calcium chloride, zinc chloride, sodium acid phosphate, sodium bisulfate, and iron chloride. The strong mineral acids are the preferred catalysts. Only a trace of the acidic catalyst ordinarily is required. When a strong mineral acid is used as the catalyst, amounts as little as 0.001% based on the weight of the reactants, may be used. As much as 5% or more of the acidic catalyst may be used, amounts of the strong mineral acid from about 0.05% to about 2% by weight being preferred. Weakly acidic catalysts may be employed in somewhat greater amounts, depending upon their strength as acids.

The alcohol is employed in a molar excess relative to the 2-hydroxyhexanedial, and preferably there are employed upwards from about 3 moles of the alcohol per mole of the 2-hydroxyhexanedial. As much as 100 moles or more of the alcohol per mole of the 2-hydroxyhexanedial may be employed, a preferred range being from about 5 to about 25 moles of alcohol per mole of the hydroxy dialdehyde.

The reaction between the 2-hydroxyhexanedial and the alcohol can be effected over a wide range of temperatures. Preferably it is accelerated by the application of heat to the reacting mixtures, elevated temperatures of from about 35° C. to about 125° C. being particularly suitable. The desired reaction is facilitated by continuously withdrawing water from the reaction mixture substantially as rapidly as it is formed therein. This may be done by conducting the reaction at the boiling point of the reaction mixture and continuously distilling off water, preferably with the aid of an added inert organic solvent, such as benzene or toluene, that forms azeotropic mixtures with water, by conducting the reaction in the presence of a solid desiccating agent, or by equivalent means.

While the products of the invention can be prepared conveniently by the reaction of alcohols with 2-hydroxyhexanedials, as described above, in some cases they can be prepared even more conveniently by the reaction of a 2-formyl-Δ5-dihydropyran with an alcohol in the presence of an acidic catalyst. The reaction, which is carried out under substantially anhydrous conditions, leads to the direct addition of three molecules of the alcohol to one molecule of the 2-formyl-Δ5-dihydropyran. The reaction can be effected by mixing the selected 2-formyl-Δ5-dihydropyran and an excess, preferably from about 5 to about 25 moles of the selected alcohol, and reacting the two in the presence of a suitable amount of an added acidic catalyst, preferably at temperatures within the range of from about 0° C. to about 80° C. As the acidic catalyst there may be employed any of the hereinbefore disclosed acidic catalysts. The amount of the acidic catalyst may be varied over wide limits, depending upon its acid strength and the particular reactants that are involved. In general amounts of the catalyst within the range of from about 0.005% to about 5% by weight of the reactants are suitable.

Whether the desired product is prepared by reaction between an alcohol and a 2-hydroxyhexanedial or between an alcohol and a 2-formyl-Δ5-dihydropyran, it can be recovered from the reaction mixture preferably by neutralizing or removing the acidic catalyst and then fractionally distilling the mixture. When a mercaptan, e. g., an alkyl mercaptan, is employed as the alcohol reactant, the product will ordinarily comprise, in addition to the desired 6-alkylthio-2-dialkylthiomethyl-tetrahydropyran, minor amounts of the analogous compounds in which one or more of the sulfur atoms is replaced by oxygen. It is preferred to separate these products by careful fractional distillation, although for some purposes their separation is not necessary and can be omitted. It will be appreciated, of course, that suitable recovery methods other than fractional distillation can be employed to purify the desired products when desired, such as fractional crystallization, treatment with inert solvents, and the like.

The 2-hydroxyhexanedial that is employed according to the method of the invention may be unsubstituted 2-hydroxyhexanedial or it may be a substituted 2-hydroxyhexanedial wherein one or more of the carbon atoms between the formyl groups is substituted by an aliphatic hydrocarbon group or groups. Suitable 2-hydroxyhexanedials thus include, in addition to unsubstituted 2-hydroxyhexanedial, the various alkyl-substituted 2-hydroxyhexanedials that are disclosed in copending application Serial No. 694,144, filed August 30, 1946, now U. S. Patent 2,639,297, wherein the carbon atoms in the 3 and the 4 positions may be substituted by alkyl groups. Specific suitable 2-hydroxyhexanedials include, among others, 2-hydroxyhexanedial, 2-hydroxy-4,5-dimethyl-hexanedial, 2-hydroxy-4-methylhexanedial, 2-hydroxy-5-methylhexanedial, 2-hydroxy-4,5-diethylhexanedial, 2-hydroxy-4,5-dipropylhexanedial, and their various homologs and analogs as well as 2-hydroxyhexanedials substituted in the 3 and the 4 positions such as 2-hydroxy-3,4-dimethyl-1,6,-hexanedial, 2-hydroxy-3,4-diethyl-1,6-hexanedial, 2-hydroxy-3-isopropyl-4-ethyl-1,6-hexanedial, 2-hydroxy-3,4-diisopropyl-1,6-hexanedial and the like shown in the above mentioned copending application. 2-formyl-Δ5-dihydropyrans that are employed in the preparation of the compounds of the present invention include, in addition to the unsubstituted 2-formyl-Δ5-dihydropyran, the various substituted 2-formyl-Δ5-dihydropyrans wherein one or more of the hydrogen atoms on the dihydropyran ring has been replaced by substituent groups, such as 2,5-dimethyl-2-formyl-Δ5-dihydropyran, 2-methyl-2-formyl-Δ5-dihydropyran, 2,5-diethyl-2-formyl-Δ5-dihydropyran, 2,5-diisopropyl-2-formyl-Δ5-dihydropyran, 2,5-diphenyl-2-formyl-Δ5-dihydropyran, and their various homologs and analogs.

One especially valuable group of the compounds of the present invention is defined by the structural formula

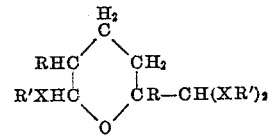

in which each R represents a hydrogen atom or a lower alkyl group, each R' represents a monovalent aliphatic radical, and X represents oxygen or sulfur. These compounds may be prepared conveniently by reacting 2-hydroxyhexanedial, 2-formyl-Δ5-dihydropyran, and mono- and di-substituted 2-formyl-Δ5-dihydropyrans wherein one or both of the 2 and 5 positions of the dihydropyran ring is or are substituted by a lower alkyl group or groups with alcohols having a monovalent aliphatic radical, R, directly linked to the hydroxyl oxygen atom or thiol sulfur atom. Although the monovalent aliphatic radicals represented by R' can be the monovalent radicals of any aliphatic alcohols, the preferred compounds are those in which such radicals each contain from 1 to 20 carbon atoms. The particularly preferred compounds of this group contain atoms of oxygen in the positions denoted by the several X's.

One subgroup of compounds defined by the preceding formula comprises those compounds wherein the radical —XR' is derived from an unsubstituted aliphatic monohydric oxy-alcohol, ROH, preferably containing from 1 to 8 carbon atoms. This group, which includes the compounds that are of most interest as cross-linking or insolubilizing agents for high-molecular weight polyhydric alcohols, is represented by the following compounds, among others: 6-methoxy-2-dimethoxymethyl-tetrahydropyran, 6-ethoxy-2-diethoxymethyl-tetrahydropyran, 6-isopropoxy-2-diisopropoxymethyl - 2,5 - dimethyl-tetrahydropyran, 6-butoxy-2-dibutoxymethyl-2,5-diethyl-tetrahydropyran, 6-hexoxy-2-dihexoxymethyl-2,5-dimethyl-tetrahydropyran, and 6-isobutoxy-2-diisobutoxymethyl-2-ethyl-tetrahydropyran. When the alcohol radical XR is derived from a higher aliphatic oxy-alcohol, the resulting sub-group comprises those compounds that are of particular interest as plasticizers, emollients, softening agents, and the like. The compounds of this subgroup are illustrated by 6-decyloxy-2-didecyloxymethyl-tetrahydropyran, 6-tetradecyloxy-2-ditetradecyloxymethyl-tetrahydropyran, and 6-stearoxy-2-distearoxymethyl-2,5-dimethyl-tetrahydropyran. A third subgroup of oxy-compounds of the invention includes those in which the alcohol radical —XR' is derived from an unsaturated oxy-alcohol, such compounds being represented by 6-allyloxy-2-diallyloxymethyl-tetrahydropyran, 6-methallyloxy-2-dimethallyloxymethyl-tetrahydropyran, 6-(2-chloroallyloxy)-2-bis(2-chloroallyloxy)methyl-tetrahydropyran, 6-allyloxy-2-diallyloxymethyl-2,5-dimethyl-tetrahydropyran, 6-cinnamyloxy-2-dicinnamylhoxymethyl-tetrahydropyran, and 6-(2-propylallyloxy) -2-bis(2-propylallyloxy)methyl-2,5-diethyl-tetrahydropyran.

A further subgroup of the tetrahydropyran derivatives of the invention is represented by the foregoing formula when at least one of the atoms designated by X is a sulfur atom. These compounds, which are produced by reacting mercaptans with 2-hydroxyhexanedials and 2-formyl-Δ5-dihydropyrans according to the process of the invention, are represented by the following compounds, among others: 6-ethylmercapto-2-diethylmercaptomethyl-tetrahydropyran, 6-ethylmercapto-2-diethylmercaptomethyl-2,5-dimethyl-tetrahydropyran, 6-amylmercapto-2-diamylmercaptomethyl-tetrahydropyran, 6-octylmercapto-2-dioctylmercaptomethyl-2,5-diethyl-tetrahydropyran, 6-dodecylmercapto-2- didodecylmercaptomethyl - 2,5 - diisopropyl-tetrahydropyran, 6-allylmercapto-2-diallylmercaptomethyl-2,5-dimethyl-tetrahydropyran, and 6-benzomercapto-2-dibenzomercaptomethyl-tetrahydropyran.

The following examples will illustrate the methods of preparation of the compounds of the invention and certain of the specific new products. It will be understood that the examples are presented with the intent to illustrate rather than to limit the invention defined in the hereto-appended claims.

Example I

A solution of approximately 170 grams of 2-hydroxyhexanedial dissolved in 250 grams of water containing 0.02 equivalents of sulfuric acid per liter was placed in a glass flask provided with external heaters and a vertically positioned fractionating reflux column equipped with a phase separating head. To the solution there were added 225 cc. of benzene. The mixture was heated at reflux while about 525 cc. of ethyl alcohol was added in several portions. As the mixture refluxed, the condensed azeotropic mixture was separated into two phases in the phase separating head of the condenser, the organic phase being returned to the flask and the aqueous phase being withdrawn from the system. The refluxing was continued until water ceased to come over, a total time of 18 hours being required. The solution then was neutralized by addition of calcium carbonate, flash distilled to remove high-boiling bottoms and then fractionally distilled under a pressure of 1 to 2 millimeters of mercury. After removal of a forerun, there was collected a cut of 172 grams distilling at 65.8–70.0° C. The fraction had a refractive index ($n$ 20/D) of 1.432. Analyses: found, 61.9% C, 10.4%; calculated for $C_{12}H_{24}O_4$, 62.0% C and 10.4% H. The product obtained in this experiment was 6-ethoxy-2-diethoxymethyl-tetrahydropyran which has a structure represented by the formula

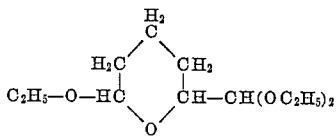

Instead of ethanol in the foregoing experiment there can be used other alcohols, such as isopropyl alcohol, butyl alcohol, amyl alcohol, dodecyl alcohol, and sulfur alcohols, such as ethyl mercaptan, amyl mercaptan, and octyl mercaptan to produce the corresponding tetrahydropyran derivatives in which the ethoxy radicals in the above formula are replaced by the corresponding radicals of the alcohol reactant. If the alcohol reactant is normally volatile at a temperature below the desired reaction temperature, the reaction may be carried out under pressure. Likewise, inert neutral solvents may be included in the reaction mixture if desired.

Example II

In a glass flask there were mixed 672 grams of 2-formyl-$\Delta^5$-dihydropyran and 480 grams of methyl alcohol, with cooling of the mixture by immersing the flask in an ice bath. After one-half hour there were added 25 cc. of a 0.16 normal solution of hydrogen chloride in methanol. Despite the cooling, the temperature of the mixture rose to 75°, indicating a rapid exothermic reaction. After one hour the hydrogen chloride was removed by contacting the solution with an anion exchange resin and the syrupy product then was flash distilled to give 750 grams of distillate at 67–109.4° C. under 15 millimeters pressure. The distillate was redistilled through a fractionating column under a pressure of 17–20 millimeters of mercury. The fraction distilling between 95.6 and 101° C. under 17 millimeters of mercury pressure was collected separately and redistilled, the heart cut being collected at 98–101° C. under 15 millimeters mercury pressure. The refractive index ($n$ 20/D) of the heart cut was 1.4375. Analyses: found, 56.3% C, and 9.5% H; calculated for $C_9H_{18}O_4$, 56.8% C and 9.5% H. The product prepared in this example is 6-methoxy-2-dimethoxy-methyl-tetrahydropyran, which has the structure represented by the formula

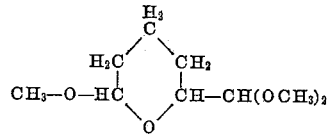

Example III

In a flask there were mixed 112 grams of 2-formyl-$\Delta^5$-dihydropyran and 202 grams of methyl alcohol. Heat was liberated when the two materials were mixed. When the initial exothermic reaction subsided there were added 0.5 gram of p-toluenesulfonic acid dissolved in 20 cubic centimeters of methyl alcohol. The mixture was heated at boiling for 5 hours with total reflux condensation of the evolved vapors. The mixture then was cooled, an excess of solid sodium carbonate was added to neutralize the acid catalyst and excess methyl alcohol was distilled off in vacuo. The residue was filtered and the filtrate distilled. There was obtained an 88% yield of crude 6-methoxy-2-dimethoxymethyl-tetrahydropyran, which upon redistillation gave a heart cut representing a 69% yield of purified product.

Instead of the methanol used in the preceding example, there can be employed, for example, allyl alcohol, to produce 6-allyloxy-2-diallyloxymethyl-tetrahydropyran, amyl alcohol to produce 6-amyloxy-2-diamyloxymethyl-tetrahydropyran, stearyl alcohol to produce 6-stearoxy-2-distearyloxymethyl-tetrahydropyran, or butyl mercaptan to produce 6-butylmercapto-2-dibutylmercaptomethyl-tetrahydropyran. By substituting for the 2-formyl-$\Delta^5$-dihydropyran a substituted 2-formyl-$\Delta^5$-dihydropyran, such as 2,5-dimethyl-2-formyl-$\Delta^5$-dihydropyran, there can be prepared: with methanol, 6-methoxy-2-dimethoxymethyl-2,5-dimethyl-tetrahydropyran; with amyl alcohol, 6-amyloxy-2-diamyloxymethyl-2,5-tetrahydropyran; with stearyl alcohol, 6-stearyloxy-2-distearyloxymethyl-2,5-dimethyl-tetrahydropyran; and with butyl mercaptan, 6-butylmercapto-2-dibutylmercaptomethyl-2,5-dimethyl-tetrahydropyran.

This application is a continuation-in-part of my co-pending application Serial No. 749,077, filed May 19, 1947.

I claim as my invention:

1. A process which comprises reacting one mole of 2-hydroxyhexanedial with three moles of ethanol in the presence of an acidic catalyst to produce 6-ethoxy-2-diethoxymethyl-tetrahydropyran.

2. The process which comprises reacting one mole of 2-hydroxyhexanedial with three moles of an alcohol, ROH wherein R is an aliphatic hydrocarbon radical having 1 to 20 carbon atoms, in the presence of an acidic catalyst to produce one mole of a compound defined by the formula

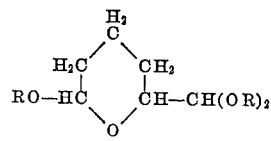

3. A process which comprises reacting one mole of a 2-hydroxyhexanedial having not more than two substituents, which substituents are lower alkyl groups not more than one of which is attached to the same carbon atom, with three moles of an alcohol, ROH wherein R is an aliphatic hydrocarbon radical having 1 to 20 carbon atoms, in the presence of an acidic catalyst to produce one mole of a tetrahydropyran substituted in the 2-position by a —CH(OR)$_2$ group and in the 6-position by a —OR group.

4. A process in accordance with claim 3 wherein a 6-alkoxy-2-dialkoxymethyltetrahydropyran is produced by reacting 2-hydroxyhexanedial with an unsubstituted alkanol of 1 to 8 carbon atoms per molecule in the presence of sulfuric acid.

5. A process which comprises reacting one mole of an aliphatic 2-hydroxyhexanedial of the group consisting of 2-hydroxyhexanedial and its lower alkyl substitution products with three moles of an unsubstituted aliphatic alcohol of 1 to 20 carbon atoms per molecule in the presence of an acidic catalyst to produce one mole of a tetrahydropyran.

6. A process which comprises reacting one mole of an aliphatic 2-hydroxyhexanedial of the group consisting of 2-hydroxyhexanedial and its lower alkyl substitution products with three moles of alcohol, RXH wherein R is an aliphatic hydrocarbon radical of 1 to 20 carbon atoms and X is a member of the group consisting of the oxygen and sulfur atoms, in the presence of an acidic catalyst to produce one mole of tetrahydropyran substituted in the 2-position by a —CH(XR)$_2$ group and in the 6-position by a —XR group, R and X in said groups having the above significance.

References Cited in the file of this patent
UNITED STATES PATENTS 2,517,543    Copenhaver _____ Aug. 8, 1950